Dec. 7, 1965 R. W. WALKER, JR 3,221,726
TARGET TRAP
Filed March 26, 1962
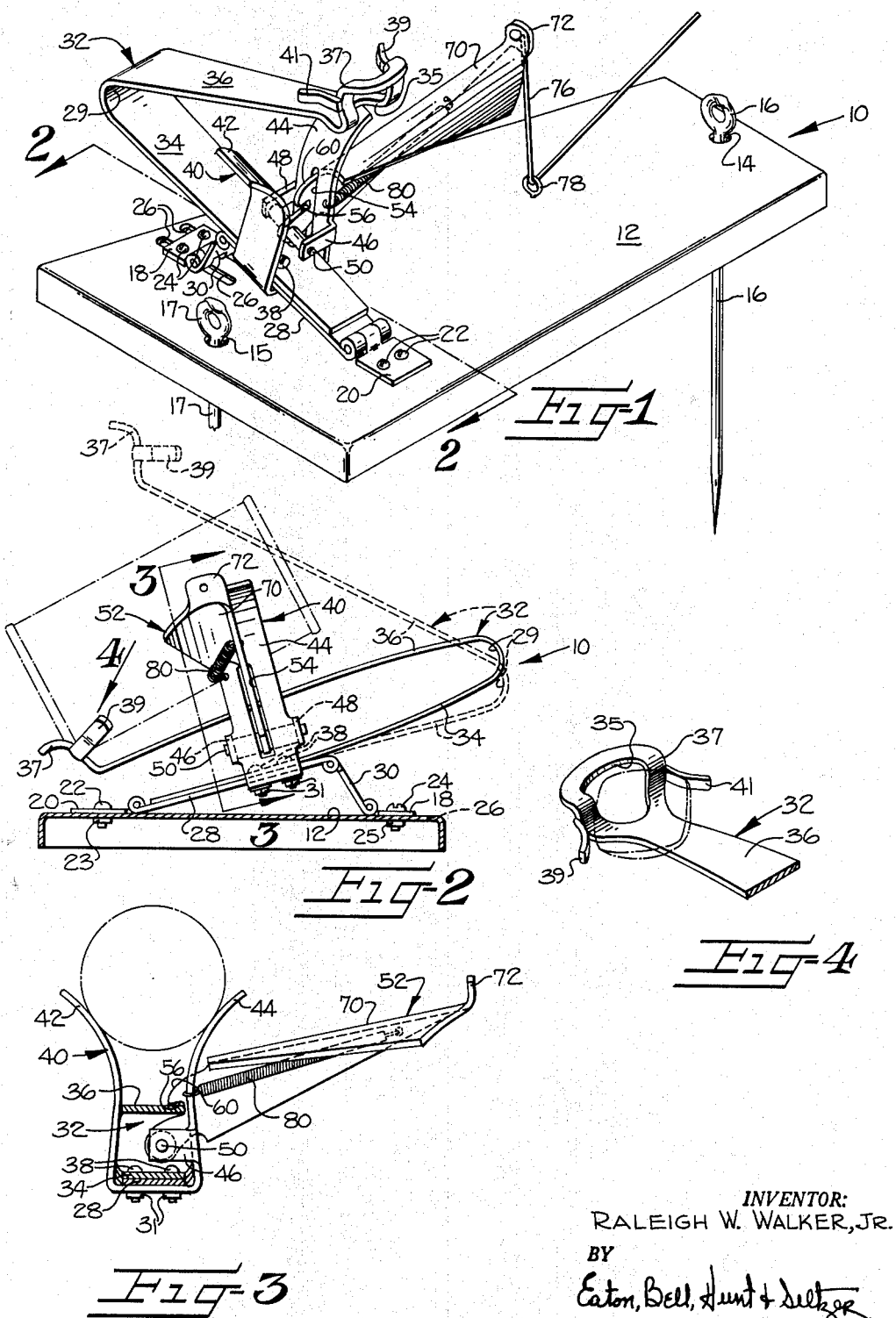
INVENTOR:
RALEIGH W. WALKER, JR.
BY
Eaton, Bell, Hunt & Seltzer
ATTORNEYS

United States Patent Office 3,221,726
Patented Dec. 7, 1965

3,221,726
TARGET TRAP
Raleigh W. Walker, Jr., 111 N. Everett St.,
Bennettsville, S.C.
Filed Mar. 26, 1962, Ser. No. 182,608
10 Claims. (Cl. 124—7)

This invention relates to traps of the type that hurl targets to be shot at into the air and, more particularly, to an improved portable target trap.

A primary object of this invention is the provision of a target trap which is of simple and inexpensive construction, but which is also sturdy, readily portable, and quite efficient in operation.

Another object is the provision of a target trap capable of utilizing as targets a variety of freely available materials, such as discarded tin cans and bottles, as well as and in addition to the more conventional, but also more expensive, clay pigeons.

Still another object is the provision of a target trap that is readily capable of rapid adjustment so as to permit both the vertical and the horizontal trajectory of the target that it hurls to be varied as desired.

A further object is the provision of a target trap that can be set or cocked and triggered or released solely by the foot of a user, and which can therefore be conveniently operated even by a person holding a gun.

A related and more specific object is the provision in a target trap of an improved latch mechanism for maintaining the trap in a cocked or set condition.

An additional related and more specific object is the provision in a target trap of guide means facilitating the act of cocking or setting the trap, and which insures that the trap will be engaged by the latch mechanism thereof and maintained in a cocked or set condition until its release or triggering is desired.

Other objects and advantages will be in part evident and in part pointed out hereinafter in the following description of an illustrative embodiment of the invention, which should be read in conjunction with the accompanying drawing, in which:

FIGURE 1 is a perspective view of a target trap embodying the invention, the trap being shown in a triggered or released condition;

FIGURE 2 is a side elevation, partially in section, of the trap shown in FIGURE 1 when viewed in the direction of the arrows 2—2, but with the set or cocked condition of the trap being shown by solid lines and the triggered or released condition thereof being shown by dotted lines;

FIGURE 3 is a fragmentary rear view, partially in section, of the trap shown in FIGURE 2 when viewed in the direction of the arrows 3—3; and FIGURE 4 is a fragmentary perspective view of the upper end of the leaf spring of the trap shown in FIGURES 1 and 2.

Referring more particularly to the drawings, the target trap identified in its entirety in FIGURE 1 by the numeral 10 includes an elongate base 12 adapted to be positioned substantially horizontally on a supporting surface, usually the ground, while the trap is in use. Base 12 may conveniently be formed, as shown, from a single piece of sheet metal or the like, the peripheral edges of which have been bent downwardly so as to constitute supporting legs for the major upper surface thereof. In order to effect a desired economy in the amount of material necessary for its formation, the base is preferably tapered or wedge-shaped, as shown, rather than perfectly rectangular. Bores 14, 15 are provided at each end of base 12 for reception of eye-bolts or rods 16, 17, which rods extend through the bores and into the ground or other surface therebeneath so as to stabilize base 12 and prevent its inadvertent movement while trap 10 is in operation.

Secured to the upper surface of base 12 adjacent the larger end thereof are a pair of hinge members 18, 20. Hinge member 20 is maintained, as by screws 22 and nuts 23, in a fixed position upon base 12. The position of hinge member 18, however, can be varied in a direction toward and away from hinge 20 by reason of the screws 24 connecting the former to base 12 projecting through and being slidable longitudinally of a pair of parallel slots 26 provided in the upper surface of the base. A supporting member in the form of a rigid strap 28 is pivotally connected at its lower end to hinge member 20, and at its upper end to a similar strap 30. The lower end of strap 30 is, in turn, pivotally connected to hinge member 18. By virtue of this arrangement, it will be apparent that adjustment of the position of hinge member 18, which can be quickly and easily effected merely by loosening nuts 25 and sliding screws 24 in the direction of slots 26, effects a corresponding adjustment of the inclination of supporting strap member 28, that is, varies the vertical angle defined between this strap and the upper surface of base 12.

Carried by and pivotally adjustable with strap 28 is a leaf spring 32 having a reverse bend 29 intermediate its opposite end portions 34 and 36. End portion 34 overlies substantially the entire length of supporting arm 28, to which it is secured by screws 38 and nuts 31, and extends in cantilever fashion forwardly therebeyond, so that reverse bend 29 of spring 32 is disposed considerably forward of the pivotal connection between straps 28 and 30 (see FIGURE 2).

End portion 36 of spring 32 extends freely above end portion 34 and strap 28, and the width thereof decreases from a widest point adjacent bend 29 to a narrowest point adjacent a substantially Z-shaped flange 37 (see FIGURE 2) provided at its terminus. As is more fully discussed hereinafter, flange 37 is intended to wholly or partially receive the target hurled by trap 10 and, in order to better accommodate targets of various types, is provided with a bore 35 extending therethrough and with lugs 39, 41 extending forwardly and outwardly from opposite sides thereof, as shown. When spring 32 is in a relaxed condition, free end portion 36 thereof occupies the normal upward position depicted by dotted lines in FIGURE 2 and by solid lines in FIGURE 1, in which the angle defined between it and end portion 34 is approximately 45 degrees. By manually applying a downward force to free end portion 36, however, the same can be moved from its normal upward position to a downward deflected position shown in solid lines in FIGURE 2, in which it and end portion 34 extend generally parallel to each other. When end portion 36 of spring 32 is allowed to return freely from its downward deflected position to its normal upward position, the rapidity and force of its movement hurls a target supported by flange 37 into the air.

In order to guide free end portion 36 of spring 32 during movement thereof between its upward and downward positions, a substantially U-shaped bracket 40 is also carried by and movable with supporting strap 28. As shown in FIGURES 1 and 2, bracket 40 may conveniently be secured to supporting strap 28 by the same screws 38 and nuts 31 maintaining end portion 34 of spring 32 in place thereon. The spaced arms 42, 44 of bracket 40 extend upwardly from strap 28 on opposite sides thereof and terminate, below the normal upward position of free end portion 36, at outwardly flared upper ends. When free end portion 36 of spring 32 is displaced from its normal upward position by the application of a downward force thereon, arms 42, 44 of bracket 40 receive and straddle the same and guide it to its downward deflected position illustrated in FIGURES 2 and 3. The outwardly flared upper ends of arms 42, 44 insure that free end portion 36 of spring 32 will be received by bracket 40, even if the force applied thereto should inadvertently be laterally, as well as downwardly, directed. The distance between arms 42, 44 of bracket 40 narrows from the upper, outwardly flared ends thereof to a point approximately midway of their height, at which point the distance between the arms is only slightly greater than the width of that part of end portion 36 received therebetween. Once free end portion 36 is received within bracket 40, therefore, it is necessarily guided by arms 42, 44 during its downward movement to the precise deflected position shown in FIGURE 3.

Arm 44 of bracket 40 is provided with a longitudinally extending slot 54 (see FIGURES 1 and 2) in its medial portion, and with a pair of ears 46, 48 extending inwardly from its side edges toward arm 42 of the bracket (see FIGURES 1 and 3). Ears 46, 48 constitute stop means limiting the maximum downward movement of which free end portion 36 of spring 32 is capable and, in addition, support a pivot pin 50 that extends therebetween generally parallel to the plane of strap 28 and intermediate the lower ends of arms 42, 44.

Secured to and pivotal about the axis of pin 50 through slot 54 of bracket 40 is a latch plate 52 having a notch 56 at its innermost end (to the left of arm 44 of bracket 40, as viewed in FIGURE 3) above its point of connection to pin 50 and below a curved cam surface 60 extending along its upper and side edges. The outer end portion of latch plate 52 constitutes an actuating lever 70 by means of which the plate can be manually pivoted in a clockwise direction so as to cause notch 56 and cam surface 60 to move outwardly through slot 54 of bracket 40. To permit this manual pivotal movement to be conveniently imparted without slippage by a user of trap 10 placing his foot upon lever 70, the upper edge thereof is rolled downwardly and an upturned flange 72 is provided at its terminus. Actuation of lever 70 in and alternative manner is provided by a cord 76 passed through a guide or eyelet 78 carried by base 12 of the trap and secured at one end to flange 72 of lever 70.

A contractile spring 80 extending between lever 70 and arm 44 of bracket 40 resiliently maintains latch plate 52 in its extreme counterclockwise position depicted in the drawings, in which notch 56 and cam surface 60 are disposed between arms 42, 44 of bracket 40. When thus disposed, it will be apparent that cam surface 60 will be engaged by free end portion 36 of leaf spring 32 as the latter is guided to its downward deflected position by arms 42, 44. This engagement of free end portion 36 with cam surface 60 pivots latch plate 52 in a clockwise direction, moving the cam surface outwardly through slot 54 and thus permitting the continued downward deflection of the free end portion of the leaf spring. As the downward movement of free end portion 36 continues past cam surface 60, latch plate 52 immediately pivots in a counter-clockwise direction under the impetus of spring 80, and entraps the edge of free end portion 36 within notch 56 (see FIGURE 3). Trap 10 is then in a set or cocked condition, and will remain so until released by actuation of lever 70.

In actual use, trap 10 is first transported to a convenient site and base 12 thereof is affixed to the ground by means of rods 16, 17. The trap is then set or cocked by manually deflecting free end portion 36 of leaf spring 32 from its upward position to its downward position, where it is automatically engaged and restrained by notch 56 of latch plate 52. It is noteworthy that this setting or cocking of trap 10 can be accomplished without utilizing the hands, by the user placing his foot upon the uppermost bend of Z-shaped flange 37 of free end portion 36 and pushing downwardly. As noted heretofore, accurate positioning of free end portion 36 in its downward deflected position and its engagement by latch plate 52 is assured, even if the force applied thereto should inadvertently be partially laterally directed. With trap 10 in its set or cocked condition, illustrated in solid lines in FIGURE 2, a target is then positioned upon flange 37 of free end portion 36. While the target employed may be of the conventional clay-pigeon type, other less expensive types of targets may also be employed with equal facility. For instance, a lump of conventional charcoal fuel, such as is illustrated in phantom lines in FIGURE 4, may be employed as a target. Discarded cans and bottles are deemed particularly desirable as targets to be hurled by trap 10, due both to their usual ready availability and to the facility with which trap 10 accommodates targets of this type. A target comprising a tin can, such as those in which food or beverages are sold, is illustrated in phantom lines in FIGURE 2. As shown, a segment of the base of the can nests within bore 35 of flange 37 of free end portion 36, while the forward end of the can is received loosely between the outwardly flared upper ends of arms 42, 44 of bracket 40. By virtue of this two-point support, it will be appreciated that cans and bottles of almost every size usually encountered can be readily accommodated by trap 10. With extremely large diameter cans, the base thereof may be supported upon lugs 39, 41 of flange 37, rather than upon the flange itself. Once a target of any desired type is positioned upon and supported by flange 37, the trap may be triggered or released by downwardly pivoting lever 70 of latch plate 52. This may be effected by a user of trap 10 stepping upon lever 70, or pulling upon cord 76. However effected, upon being released, free end portion 36 of leaf spring 32 returns rapidly to its upward position, and the target is hurled into the air.

Since end portion 34 of leaf spring 32 is cantilevered upon link 28, rather than being rigidly secured thereto along its entire length, that portion thereof adjacent reverse bend 29 is capable of some limited deflection upon the rapid return of free end portion 36 to its normal upward position. This limited deflection of end portion 34 of spring 32 is deemed desirable inasmuch as it tends to absorb a significant part of the reaction force of the return movement of free end portion 36, which reaction force might otherwise tend to shift the position of base 12 upon the ground or other supporting surface.

The vertical trajectory of the target hurled by trap 10 can be quickly and easily varied merely by loosening nuts 25 and sliding screws 24 and hinge member 18 longitudinally of slots 26, thereby simultaneously varying the inclination of link 28 and leaf spring 32. Variation of the horizontal trajectory of the target can also be readily achieved, it being necessary merely to withdraw one of the rods 16, 17 from its bore and thereafter pivot base 12 about the other rod to a new position. It should be noted that irrespective of the trajectory selected the full return force of free end portion 36 of spring 32 is employed to hurl the target into the air.

It will thus be seen that the instant invention provides a target trap possessing the advantages and realizing the objects hereinbefore noted, along with many practical benefits.

In the drawings and specification there has been set forth a preferred embodiment of the invention and, although specific terms are employed, they are used in a generic and descriptive sense only and not for purposes of limitation, the scope of the invention being defined in the claims.

That which is claimed is:
1. A target trap comprising:
 (a) a base;
 (b) a supporting member carried by said base for pivotal adjustment about a substantially horizontal axis;
 (c) means for securing said supporting member in a desired position of pivotal adjustment relative to said base;

(d) a leaf spring mounted upon said supporting member for pivotal adjustment therewith, said leaf spring having a free end portion manually movable relative to said supporting member and said base from a normal relaxed upward position to a downward deflected position and rapidly returnable from said downward deflected position to said normal upward position;

(e) a pair of spaced arm members carried by and extending upwardly from said supporting member, said arm members terminating below said normal relaxed upward position of said free end portion of said leaf spring and being adapted to straddle said free end portion of said leaf spring during said manual movement thereof and guide the same to said downward deflected position; and (f) latch means carried by one of said arm members and pivotally movable toward and away from the other of said arm members for releasably maintaining said free end portion of said leaf spring in said downward deflected position.

2. A target trap comprising:

(a) a base;

(b) an elongate supporting member carried by said base for pivotal adjustment about a substantially horizontal axis, whereby the vertical inclination of said supporting member relative to said base can be varied;

(c) means for securing said supporting member in a desired position of pivotal adjustment relative to said base;

(d) a leaf spring mounted upon said supporting member for pivotal adjustment therewith, said leaf spring having a free end portion manually movable relative to said supporting member and said base from a normal upward position to a downward deflected position and rapidly returnable from said downward deflected position to said normal upward position;

(e) a pair of spaced arm members carried by and extending upwardly from said supporting member, the upper ends of said arm members being flared outwardly away from each other and disposed below said normal upward position of said free end portion of said leaf spring, said arm members being adapted to straddle said free end portion of said leaf spring and guide the same during manual movement thereof to said downward deflected position;

(f) latch means carried by one of said arm members and pivotally movable toward and away from the other of said arm members for releasably maintaining said free end portion of said leaf spring in said downward deflected position, said latch means having a cam surface thereon engageable by said free end portion of said leaf spring during manual movement thereof to said downward deflected position;

(g) contractile spring means resiliently urging said latch means toward said other of said arm members and into latching engagement with said free end portion of said leaf spring in said downward deflected position; and (h) lever means connected to said latch means for manually pivoting said latch means away from said other of said arm members and out of engagement with said free end portion of said leaf spring, said free end portion of said leaf spring returning rapidly from said downward deflected position to said normal upward position upon disengagement of said latch means and thereby hurling a target positioned thereon into the air.

3. A target trap as in claim 2, wherein said one of said arm members has a slot extending generally longitudinally thereof, and wherein said latch means is pivotally movable through said slot about an axis disposed between and adjacent the lower ends of said arm members.

4. A target trap as in claim 2, wherein said supporting member comprises a rigid strap pivotally connected at one end to said base, and wherein said means for securing said supporting member in a desired position of pivotal adjustment includes a second strap interconnecting the other end of said first strap and said base.

5. A target trap comprising:

(a) a base;

(b) a rigid strap member pivotally connected at one end to said base for pivotal adjustment about a substantially horizontal axis;

(c) means interconnecting the other end of said strap member and said base for securing said strap member in a desired position of pivotal adjustment relative to said base;

(d) a leaf spring having a reverse bend intermediate its opposite end portions, one end portion of said leaf spring being secured to and extending longitudinally of said strap member and the other end portion of said leaf spring extending freely above said one end portion thereof and said strap member, said leaf spring being pivotally adjustable with said strap member and said free end portion of said leaf spring being manually movable relative to said strap member from a normal upward position to a downward deflected position and rapidly returnable from said downward deflected position to said normal upward position;

(e) target receiving means integral with and adjacent the terminus of said free end portion of said leaf spring;

(f) a substantially U-shaped bracket carried by said strap member with the spaced apart arms thereof extending upwardly from said strap member on opposite sides thereof, the upper ends of said arms of said bracket being flared outwardly away from each other and one of said arms of said bracket having a slot extending longitudinally thereof, said arms of said bracket being adapted to straddle said free end portion of said leaf spring and guide the same during manual movement thereof to said downward deflected position;

(g) a pivot pin carried by said bracket intermediate the lower end portions of said arms thereof;

(h) latch means carried by said pivot pin and pivotally movable through said slot within said one arm of said bracket for releasably maintaining said free end portion of said leaf spring in said downward deflected position;

(i) contractile spring means carried by said U-shaped bracket and resiliently urging said latch means inwardly through said slot and into latching engagement with said free end portion of said leaf spring in said downward deflected position;

(j) said latch means having a cam surface thereon engageable by said free end portion of said leaf spring during said manual movement thereof for pivoting said latch means outwardly through said slot and thereby permitting passage of said free end portion of said leaf spring to said downward deflected position; and (k) lever means integral with said latch means and manually operable by the foot of a user for pivoting said latch means outwardly through said slot and out of engagement with said free end portion of said leaf spring, said free end portion of said leaf spring returning rapidly from said downward deflected position to said normal upward position upon disengagement of said latch means and thereby hurling a target within said target-receiving means into the air, the vertical trajectory of said target being variable by varying the position of pivotal adjustment of said strap member relative to said base.

6. A target trap as in claim 5, wherein said one end portion of said leaf spring is secured in cantilever fashion to said strap member with said reverse bend of said leaf spring being disposed forwardly of said strap member, whereby said one end portion of said leaf spring is capable of limited deflection relative to said strap member.

7. A target trap as in claim 5, wherein said base has a slot therein, and wherein said means interconnecting the other end of strap member and said base includes a hinge slidably adjustable along said base longitudinally of said slot therein, fastener means extending through said hinge and said slot within said base for clamping said hinge in a desired position of adjustment, and a second strap member pivotally connected at one end to said hinge and pivotally connected at its other end to said first-mentioned strap member.

8. A target trap comprising:
   (a) a base;
   (b) an inclined support on said base;
   (c) a leaf spring having a reverse bend intermediate lower and upper opposite end portions, said lower end portion of said spring being connected to said support and said upper end portion overlying said lower end portion;
   (d) means forming a target receiving nest on the terminus of said upper end portion of said spring;
   (e) a pair of arms extending upwardly adjacent opposed sides of said lower end portion of said spring, at least the upper portions of said arms extending upwardly in diverging relationship for readily receiving therebetween said upper end portion of said spring and thus limiting sideway of said upper end portion when the same is manually forced downwardly between said arms;
   (f) a manually releasable laterally movable spring urged latch adjacent at least one of said arms and having an upper protruding cam surface normally laterally urged into the vertical plane of said upper end portion of said leaf spring whereby said latch is forced laterally outwardly as said upper end portion of said leaf spring is moved downwardly between said arms and guided by said arms into contact with said cam surface; and
   (g) movement of said upper end portion of said leaf spring downwardly below said cam surface serving to permit inward movement of said latch such as to restrain said upper end portion of said leaf spring from upward movement until said latch is subsequently released.

9. A target trap comprising:
   (a) a base;
   (b) a support on said base;
   (c) a leaf spring having a reverse bend intermediate lower and upper opposite end portions, said lower end portion of said spring being secured to and carried by said support and said upper end portion being manually movable relative to said lower end portion in a substantially vertical path from a normal upward position to a downward deflected position and being rapidly returnable from said downward deflected position to said normal upward position;
   (d) latch means mounted adjacent one side of said spring and pivotally movable into and out of said path of movement of said upper end portion thereof about an axis underneath and in vertical alinement with said path of movement for releasably latching said upper end portion in said downward deflected position, said latch means having a cam surface thereon engageable by said upper end portion of said leaf spring during said manual movement for pivoting said latch means outwardly and thereby permitting passage of said upper end portion to said downward deflected position;
   (e) resilient means biasing said latch means into said path of movement of said upper end portion of said leaf spring with said cam surface overlying said upper end portion of said leaf spring when the same occupies said downward deflected position;
   (f) and means mounted adjacent said latch means and said path of travel of said upper end portion of said leaf spring for guiding said upper end portion along at least the lower part of said path of travel thereof.

10. A target trap as in claim 9, wherein said guiding means terminates below said normal upward position of said upper end portion of said leaf spring, and wherein said upper end portion of said leaf spring is in a relaxed condition when in said normal upward position, and further including lever means integral with said latch means and manually operable by the foot of a user for pivoting said latch means out of said path of movement of said upper end portion of said leaf spring, thereby allowing said upper end portion of said leaf spring to return rapidly from said downward deflected position to said normal upward position and thus hurl a target positioned thereon into the air.

References Cited by the Examiner

UNITED STATES PATENTS

| | | | |
|---|---|---|---|
| 202,301 | 4/1878 | Taltavull | 124—36 X |
| 221,021 | 10/1879 | Beck | 124—1 |
| 833,372 | 10/1906 | Davis | 124—7 |
| 1,051,470 | 1/1913 | Waldmann | 124—50 X |
| 1,237,346 | 8/1917 | Limoges | 124—36 X |

RICHARD C. PINKHAM, *Primary Examiner.*

JAMES W. LOVE, *Examiner.*